US006810248B2

United States Patent
Green et al.

(10) Patent No.: US 6,810,248 B2
(45) Date of Patent: Oct. 26, 2004

(54) CELL RELATION MANAGER

(75) Inventors: Per Green, Järfälla (SE); Jan Andersson, Kista (SE); Tomas Langer, Danderyd (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 453 days.

(21) Appl. No.: 09/908,631

(22) Filed: Jul. 20, 2001

(65) Prior Publication Data

US 2003/0054819 A1 Mar. 20, 2003

(51) Int. Cl.[7] .............................. H04M 3/00; H04Q 7/20
(52) U.S. Cl. .................... 455/423; 455/422.1; 455/424; 455/418; 455/446
(58) Field of Search ............................ 379/94; 455/437, 455/438, 439, 446, 449, 418, 419, 420, 422.1, 423, 424, 425; 370/389

(56) References Cited

U.S. PATENT DOCUMENTS

| 5,412,753 | A | | 5/1995 | Alston et al. |
| 5,434,798 | A | * | 7/1995 | Madebrink et al. ......... 709/221 |
| 6,014,669 | A | | 1/2000 | Slaughter et al. |
| 6,057,757 | A | | 5/2000 | Arrowsmith et al. |
| 6,185,437 | B1 | | 2/2001 | Bark |
| 6,539,015 | B2 | * | 3/2003 | Voit ........................... 370/389 |
| 2002/0093943 | A1 | * | 7/2002 | Oliveira ..................... 370/352 |

FOREIGN PATENT DOCUMENTS

WO 95/12291 5/1995

OTHER PUBLICATIONS

V. Catania et al., "Monitoring Performance in Distributed Systems", Computer Communications, NL Elsevier Science Publishers B.V., Amsterdam, vol. 19, No. 9., Aug. 1, 1996, pp. 788–803, XP004052764 ISSN: 0140-03364.

* cited by examiner

Primary Examiner—William Trost
Assistant Examiner—Meless Zewdu

(57) ABSTRACT

Apparatus and methods for managing the operation of wireless communication systems are described for transferring inter-exchange information. Interdepending data pertaining to inter-exchange traffic handling events is transferred from the exchange where the data was entered in man-machine-language (MML) by a human operator to other applicable exchanges where the data is automatically entered base upon a subscription between the serving exchange and the target exchange.

12 Claims, 5 Drawing Sheets

CELL RELATION MANAGER

FIELD OF THE INVENTION

The present invention relates generally to telecommunication systems, and more particularly, to improved systems and methods of providing interdepending data to exchanges in a wireless communication system.

BACKGROUND

As wireless communication continues to gain acceptance and popularity, the number of subscribers, especially in metropolitan areas, steadily increases towards system capacity limits. To handle the increased volume, new equipment is often added to increase the capacity of the high traffic areas. At the same time, wireless telecommunications technology is constantly evolving in an effort to increase capacity, and improve the quality and functionality of wireless systems. Network operators continually seek better ways of managing and optimizing the operation of wireless communication systems. Improved system management schemes often require the tracking and dissemination of various parameters and variables which change over time to reflect the conditions of the system. Some of the changes in the conditions of communications systems are due to equipment which has been newly added or reconfigured. Newly added equipment generally entails some initialization of the new portions, and the existing portions, of the communication system. Upon adding new equipment, or redefining coverage areas of existing equipment, the data for various connections and parameters of the new equipment must be initialized and stored. In addition, any data of existing equipment which is affected must also be revised.

The newly added equipment may be a wireless exchange such as a mobile switching center (MSC) having several different cells. For example, in a city covered by two MSCs, a third MSC could be added to handle an increase in the number of mobile users. The third MSC may cover additional surrounding areas outside of the city as the population spreads out. Alternatively, the third MSC may cover portions of the same area previously covered by the two original MSCs if the geographic region stays the same size but the density of users increases.

FIG. 1 is a conventional cellular radio system 100 which provides communication service to a number of cells C1–C5. Each one of the cells C1–C5 has one of the fixed base stations (116–124) within its boundaries. The base stations each include a transmitter, receiver, and base station controller. The radio system 100 includes a number of MSCs, e.g., MSC 126 and MSC 128. Each MSC is connected to and controls one or more of the base stations (116–124). For example, MSC 126 serves base stations 116 and 124, while MSC 128 serves base stations 118, 120, and 122. The MSCs 126 and 128, in turn, are connected to a public switched telephone network (PSTN) (not shown). The MSCs 126 and 128 are also connected to a home location register (HLR) 130.

Configured as such, the radio system 100 provides communication services to mobile users located within the radio coverage area of the system 100, such as the mobile stations 102–114 shown in the figure. The MSCs switch calls to connect various wireline and mobile subscribers. The MSCs also provide control signaling to the mobile stations, and are used for operational administration and maintenance of the system 100. As more MSCs are added to the radio system 100 to handle increases in wireless usage, each new MSC must be initialized with the data and parameters necessary for communications with the surrounding MSCs. This is generally done by manually programming the interdepending information into the new MSC using man machine language (MML). Changes to interdepending information can be effected by a human operator manually entering system parameters using Ericsson's AXE-10 MML. In such systems the operator enters an MML command which has the parameter values in the appropriate fields. For example, in AXE-10 the "MTCTC" command can be used to set the channel number to 315 and the attenuation of the output power to 6 dB in control channel device 10 (i.e., "MTCTC: DEV=MCC-10, CHNR=315, ATT=6;").

Other sorts of data may be entered into an MSC, and then into adjacent MCSs, to assist network operators in adjusting the system characteristics and operational parameters. For example, system operators may rely on counter-based systems on the network side to gather performance data. Such performance data may be used to maintain their systems and allocate resources. Handover statistics are among the performance parameters and events which are often tracked using the event counters, including attempted and successful handovers into or out of a cell. In other instances, the mobile terminal may make measurements and report the results to the system, for entry into one or more wireless exchanges. Such mobile terminal measurements include, for example, signal strength measurements for downlink signals (i.e, from the base station to the user). In either the case of counter-based system statistics or mobile unit measurements, post-processing may be used to convert collected event data into a more user-friendly format such as a report, or graph, which may be read by a human operator, and entered into one or more MSCs. In this way, the human operator can alter the system configuration on the basis of the performance information from the report or graph. Systems for making measurements and forwarding various parameters in wireless communications systems are discussed in U.S. patent application Ser. No. 09/305,087, the entire contents of which are herein incorporated by reference in their entirety.

SUMMARY

A drawback of conventional systems is that interdepending data must be manually entered twice, once in each adjacent wireless exchange, that is, once in the serving exchange and then again in a target exchange. These and other drawbacks, limitations and problems associated with conventional network management techniques are overcome according to the present invention which is drawn to various method and apparatus embodiments for providing interdepending data to a serving exchange and one or more target exchanges in a communication system. The present invention provides interdepending data to the exchanges without impacting the other data of the communication system, e.g., the payload data or communications data.

In accordance with embodiments of the present invention, interdepending data can be provided to a serving exchange and one or more target exchanges in a wireless communication system by manually entering cell data for the cell of a first exchange, the cell data comprising interdepending data, which triggers an update event. In response, a data update message is defined and then conveyed to one or more target exchanges.

DESCRIPTION OF THE DRAWINGS

These and other objects, features and advantages of the present invention will be readily understood by those skilled in the art by reading the following detailed description in conjunction with the drawings, in which.

DETAILED DESCRIPTION

Figure 1:
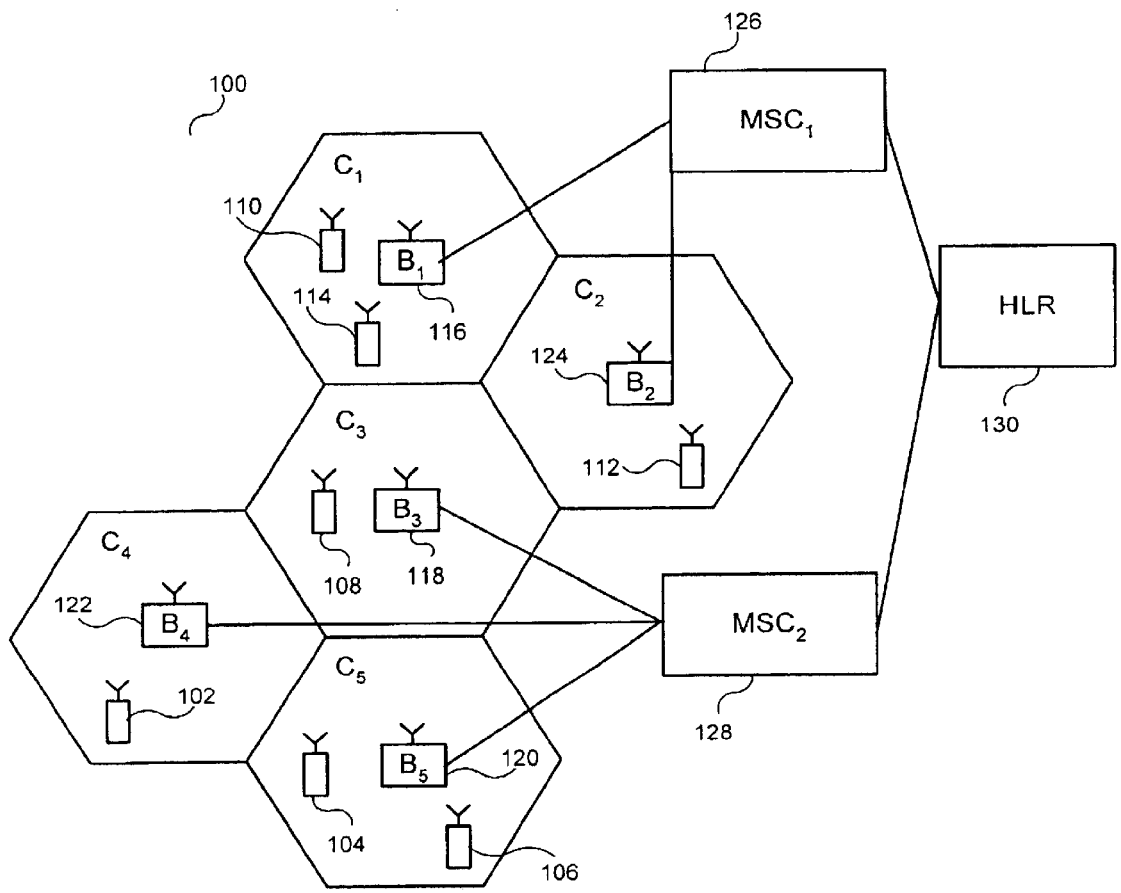
FIG. 1 illustrates a conventional cellular radio system 100 which provides communication service to a number of cells C1–C5.

A wireless exchange, e.g., an MSC, is programmed with data in order to carry out traffic handling events. A handoff is one example of a traffic handling event which entails cell data programming. Traffic events may be either inter-exchange traffic events or intra-exchange traffic events. For example, a handoff is referred to as an intra-exchange handoff when the two cells involved in the handoff are part of the same wireless exchange, that is, only one exchange is involved. If the serving cell and the target cell belong to different wireless exchanges, then an inter-exchange handoff is performed.

For an intra-exchange traffic event, such as a handoff from one cell of an exchange to another cell within that same exchange, the cell data necessary to effect the handoff is contained within the exchange. However, an inter-exchange traffic event such as a handoff from a cell of one exchange to a cell of another exchange entails the sharing of some interdepending information between the two exchanges. Hence, for traffic handling events between two wireless exchanges such as a handoff between a first exchange and another exchange, both exchanges, e.g., both the first exchange and the adjacent exchange, are programmed with interdepending data. In accordance with the present invention, the interdepending data which is entered in one wireless exchange (i.e., the serving exchange) may be automatically updated and entered into the appropriate corresponding exchange (target exchange) without the need for manually programming the MML more than one time. In the context of the present invention, interdepending data which is "automatically" entered into a target exchange does not require entry of the cell data by a human operator into the target exchange. Hence, automatic data entry does not require a human operator to enter MML into the target exchange.

For a particular piece of interdepending data entered into a serving exchange, there may be one or more target exchanges, e.g., one or more adjacent exchanges. Some examples of interdepending data which may be included in an update signal include cell related information such as target cell ID, voice vocoder and data capabilities, control channel type, color code, power level of accessing the system, system protocol version, minimum downlink signal strength required for a mobile to select the channel, network type, private system identification number, or other like parameters or data.

Situations often arise which involve the programming or revision of interdepending data. For example, the interdepending data generally changes when exchanges are added to a wireless telecommunication system, or when the cells of an existing exchange are reconfigured. As more exchanges, or more cells, are added to the radio system to handle increases in wireless usage, each new exchange is initialized with the data and parameters necessary for communications with the surrounding exchanges. This is typically done in the newly added or reconfigured exchange by manually programming the interdepending information into the exchange using MML. In addition, the data and parameters must be updated for the existing exchanges which surround a newly added exchange. The present invention overcomes the disadvantages of conventional systems which require human operators to manually enter the MML data and thus separately program each newly added or reconfigured exchange with interdepending data.

Figure 2:
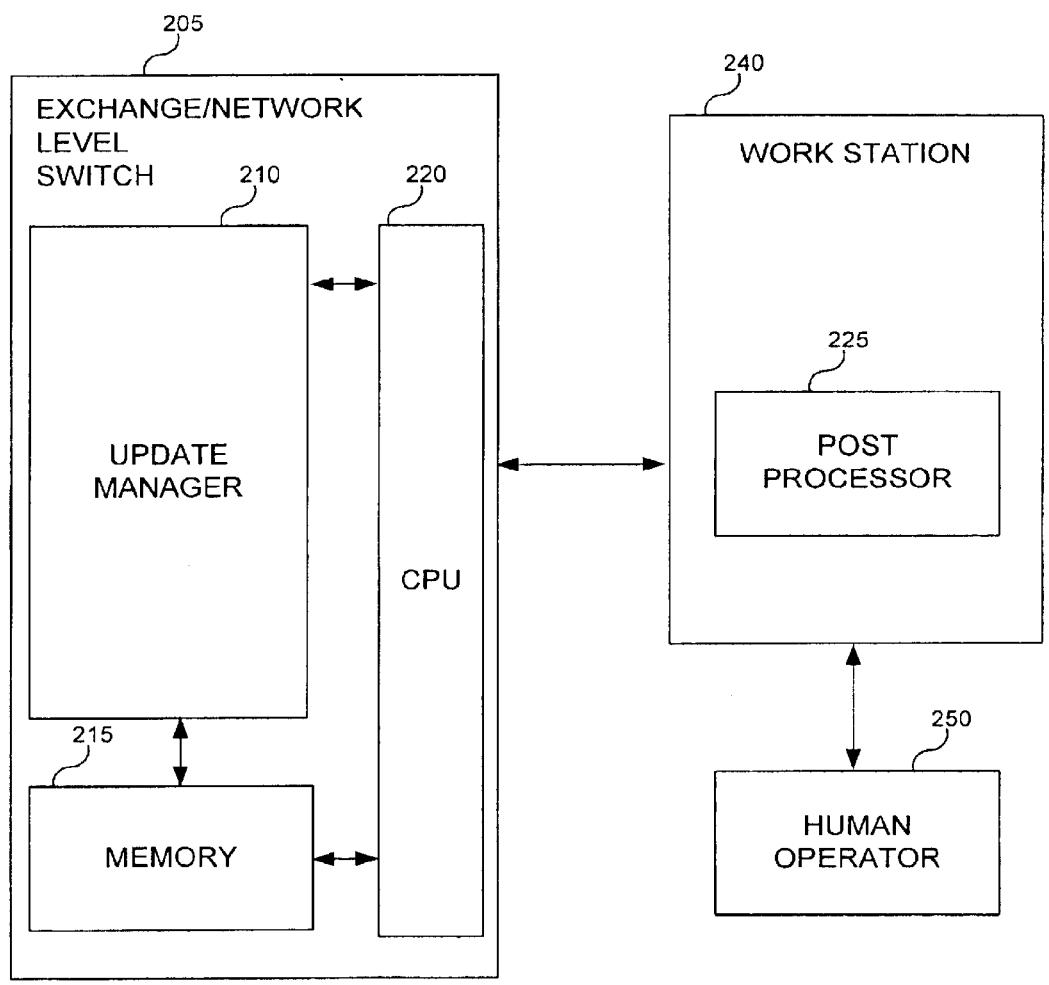
FIG. 2 depicts an exemplary system for the initial entry of interdepending data into a serving exchange.

FIG. 2 depicts an exemplary system for the initial entry of interdepending data into a serving exchange which is connected to a target exchange by a communication link. The term "serving exchange" is defined as the exchange, or the equipment, in which an interdepending data change is initially entered by a human operator. For example, if a new exchange is added, then that newly added exchange may be considered the "serving exchange," with the interdepending data for that newly added exchange being entered by a human operator. A target exchange is an exchange other than where the data was entered which is also affected by the interdepending data. The serving exchange and target exchange are connected by a communication link.

Each exchange level switch or network level switch, e.g., switch 205, either contains input/output (I/O) device 240 as shown in FIG. 2, or else is in communication with a I/O device 240. The I/O device 240 is where exchange-related data can be entered. For example, interdependent data can be entered by a human operator 250 into the I/O device 240 in response to an exchange being newly added or reconfigured, or otherwise subject to a change in interdependent information. The interdependent information entered by the human operator 250 can involve the handoff relationship parameters between adjacent cells belonging to different exchanges. The parameters entered by human operator 250 can include new or modified channel assignments for a cell, cell identification numbers, default power levels, maximum or minimum power levels, or other like parameters such as measurement channel numbers.

Each time an exchange is reconfigured or added to a system, the updated interdependent information is entered by human operator 250. The interdepending data of the serving exchange may be associated with newly added equipment, a newly added coverage area, or the a reconfiguration of an existing coverage area. For example, as the number of mobile users increases in a city covered by two wireless exchanges, a third exchange could be added. The third exchange could cover additional, new coverage areas surrounding the city. Alternatively, the third exchange could cover reconfigured coverage areas which were previously covered by the two existing wireless exchanges. That is, the two exchanges could be reconfigured to have three exchanges which cover the same area previously covered by the two exchanges. The later situation often arises when the density of users increases for a geographic region which stays the same size.

The interdependent information may alternatively be derived from data, e.g., performance data, collected in exchange level or network level switch 205. To collect such data, the switch 205 may be configured to contain event counters 0 . . . n. A post-processing application 225 can then be used to convert traffic event data collected in the switch 205 into a user-friendly format, such as a report or graph, for the human operator 250. The human operator 250 may then alter or update the configuration of the switch 205 based on the information provided by the post-processing application 225.

Interdependent data entered by the human operator 250 into the switch 205 under the control of processor 220 may be stored in a memory 215, or like type of storage means, before being further processed. Once the interdependent data is entered by the human operator 250, an update manager 210 processes and conveys the interdependent data in accordance with the present invention. The interdependent data is also stored in the memory 215 or other storage means after being processed. The update manager 210 can reside in a processor or other logic within the the switch 205 of the serving exchange, or data owning equipment. The operation of the update manager 210 in processing and conveying interdependent data is discussed further, in conjunction with FIG. 3.

Figure 3:
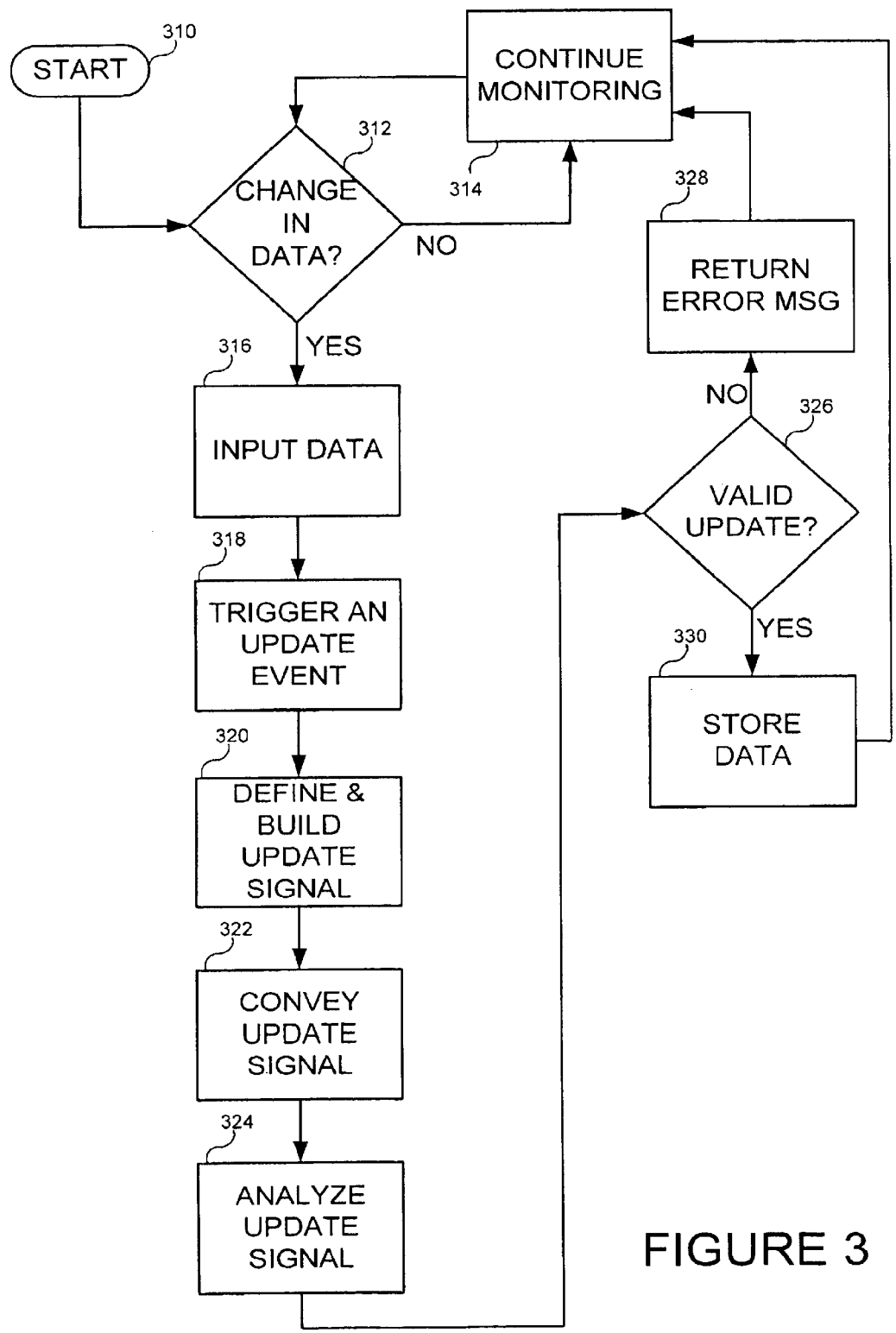
FIG. 3 is an exemplary flowchart of a method of communicating interdepending data to a plurality of exchanges in a wireless communication system according to the present invention.

FIG. 3 is an exemplary flowchart of a method of communicating interdepending data to a plurality of exchanges in a wireless communication system according to the present invention. The method begins in step 310 and proceeds to step 312 where it is determined whether a change in interdepending data has taken place. If no change in data has taken place, the method proceeds in accordance with the "NO" branch from step 312 to step 314 to continue the monitoring process for a change in data. If a change in interdepending data has taken place, the method proceeds in accordance with the "YES" branch from step 312 to step 316 for input of the changed interdepending data.

In step 316, the changed interdepending data is inputted into the serving exchange by a human operator. The interdepending data may be entered into an exchange level switch, a network level switch, or other like switching element, switching means or exchange means within a communication system. Generally, the human operator is physically located at the serving exchange when entering interdependent data. However, the human operator may manually enter the data at another location, or may enter the data using equipment other than a keyboard of the serving exchange, and then transfer the manually entered data to the serving exchange.

After the interdepending data has been entered in step 316, the method proceeds to step 318. In step 318 the serving exchange triggers an update event in response to entry of interdepending data in step 316. That is, if the data manually entered in step 316 is the type of interdepending data which will necessitate entry of associated data in another exchange, then the serving exchange triggers, or initiates, an update event which entails the performance of updating the interdepending data in the appropriate target exchanges. The triggering may be done by an update manager, and may be contingent upon predetermined criteria, such as the data being of a particular type, or the other exchange having a subscription to the update manager service, in a manner akin to that further disclosed in conjunction with FIG. 4. By "subscription," it is meant that the other exchange (i.e., the target exchange receiving the update message) is associated with, or cooperates with, the serving exchange so as to receive updated interdependent information. The term subscription, as used herein, does not necessarily imply an exchange of goods or services for a monetary fee. Instead, the term subscription relates to the association of, or cooperation between, a serving exchange and a target exchange. A target exchange which has a subscription to a serving exchange can use some, or all, of the interdepending data in an update signal.

Once an update event has been triggered in step 318, the method proceeds to step 320 where the update manager defines one or more update signals. For example, in defining the update signal in step 320, it is determined whether the updated cell of the serving exchange has adjacent cells belonging to another exchange. For each of these adjacent border cells, the appropriate interdependent data can be sent to the switch of the target exchange associated with that adjacent cell. In addition, step 320 builds the update signal for sending to the target exchange. That is, the data to be sent in the update signal is formatted and addressed in an appropriate matter for conveying to the target exchange. For example, the step of defining and building an update signal may comprise the building of an IS-41 signal, or a signal in accordance with another telecommunication specification.

Upon completing step 320, the method proceeds to step 322 in which the update signal is conveyed to the appropriate target exchanges. It may be that the serving exchange only needs to send one or more update signals to one target exchange. However, if the serving exchange has cells which border on the cells of multiple wireless exchanges, then, typically, all those target exchanges would receive update signals from the serving exchange, in accordance with step 322. Exemplary embodiments of the present invention are configured such that the serving exchange performs the steps from step 310 up through step 322, and the target exchange performs steps 324 through 330. However, in alternative embodiments, the system may be configured such that some of these steps, or partial functions of the steps, are performed in the other exchange than specified above, or in another processing facility.

Upon completing step 322, the method proceeds to step 324 where each wireless exchange which receive the update signal in step 322 analyzes the update signal. In exemplary embodiments of the present invention, the analysis of the update signal can be based upon whether or not the operator of the wireless exchange which receives the update signal has a subscription service. Other predetermined criteria, such as the data being of a particular type or content, may be used in the step 324 for analyzing and applying the update signal. In alternative embodiments, the analysis step 324 may be performed within the update manager prior to conveying the update signal in step 322. Upon completing step 324 in the embodiment depicted in FIG. 3, the method proceeds to step 326.

In step 326, it is determined whether the update signal contains valid interdependent data appropriate for that exchange. For example, it may be that the target exchange receiving the update signal has inactivated or otherwise reconfigured its cell which is adjacent to the cell in the serving exchange. Alternatively, it may be that the data would otherwise be valid, but is treated as invalid because the target exchange receiving the update signal does not subscribe to an update manager subscription service. In either case, it would be determined that the update message contains at least some invalid data. If it is determined in step 326 that there is invalid data, the method proceeds in accordance with the "NO" branch to step 328 to return an error message to the serving exchange, and then continuing for a change in interdependent data in accordance with step 314. If, in step 326, it is determined that the update signal contains valid data, the method proceeds in accordance with the "YES" branch from step 326 to step 330 where the interdependent data is stored in the target exchange which received the update signal. It may be that the data stored in step 330 is less than the entirety of the update messages conveyed in step 322, depending, for example, upon the amount of the update signal which is appropriate for use and stored in the receiving exchange. That is, a portion of the update signal sent by the serving exchange may not be applicable to the target exchange in which it is received, and therefore that portion would not ordinarily be stored in step 330. Upon storing the data in step 330, the task is completed, and the method proceeds to step 314 to continued monitoring.

Figure 4:
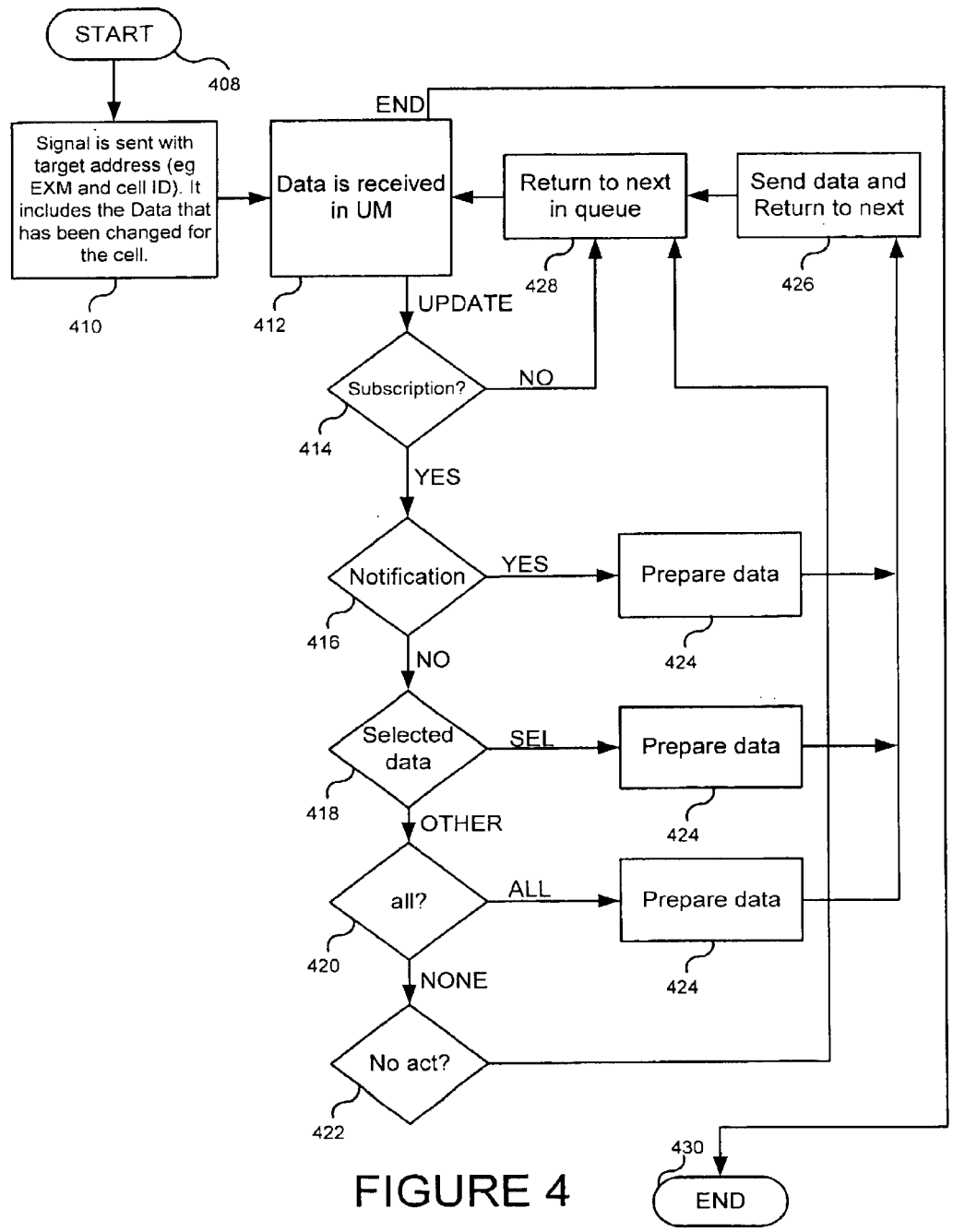
FIG. 4 depicts an exemplary flow diagram of functions performed by an update manager service.

FIG. 4 depicts an exemplary flow diagram of functions performed by an update manager service, according to the present invention. The update manager service may be implemented as a procedure, algorithm, logical steps or set of instructions, which are performed in the serving exchange. In alternative embodiments, some of the steps depicted in the figure, or functions of the steps, may be performed in the target exchange.

The method begins in step 408 and proceeds to step 410 for communication of interdepending data from an input device or storage memory of the serving exchange to the update manager. After the update signal has been received in step 412, the method proceeds to step 414, for a determination of whether the target exchange has a subscription. If the target exchange does not have a subscription service, the method proceeds in accordance with the "NO" branch to step 428, where another loop begins. Otherwise, for a target exchange which does have a subscription as determined in step 414, the method proceeds in accordance with the "YES" branch to step 416. In other embodiments, all update signals are treated the same (e.g., treated as if the target exchange has a subscription) regardless of whether the target exchange has a subscription or not. In such embodiments, the data retrieved and processed by the target exchange depends on the parameters and functionality of the target exchange's subscription.

In step 416 it is determined whether the update signal is being sent for the purpose of conveying notification information to the target exchange. If, in step 416, it is determined that a notification message is to be sent, the method proceeds in accordance with the "YES" branch to step 424. In step 424 the update signal, taking the form of a notification message, is prepared, and the method then proceeds to step 426. If, in step 416, it is determined that the update signal is not a notification message, the method proceeds in accordance with the "NO" branch to step 418.

In step 418 it is determined whether the target exchange subscribes to only certain types of data which may be contained within an update message, but not all of the update message parameters. For example, a target exchange may a predetermined arrangement to subscribe only to one or more selected types of data, e.g., a channel number, a system identification (SID) or a private system identification (PSID). If, in step 418, it is determined that a target exchange subscribes to selected types of interdepending data, then the method proceeds in accordance with the "SEL" branch from step 418 to step 424 for preparation of the appropriate update signal. If step 418 determines that a target exchange subscribes to all interdepending data, then the method proceeds in accordance with the "OTHER" branch from step 418 to step 420.

In step 420, if it is determined that the target exchange subscribes to update signals having all interdepending data, the method proceeds in accordance with the "ALL" branch from step 420 to step 424 for preparation of the appropriate update signal. If, in step 420, it is determined that the target exchange does not subscribe to update signals having all interdepending data or that the target exchange no longer exists, then no update signal is sent and the method proceeds in accordance with the "NONE" branch from step 420 to step 422. From step 422, the method proceeds via step 428 and returns for the next item of data in the queue.

The method depicted in FIG. 4 may proceed to step 424 from any of steps 416, 418 or 420. In step 424, the update signal is prepared for sending to the target exchange, by defining the signal, properly addressing and formatting it, and encoding it for communication to the target exchange. Once the update signal has been prepared in step 424, the method proceeds to step 426 where it is sent to the target exchange. After the update signal is sent in step 426, the method proceeds to step 428. Step 428 informs the update manager which received the interdepending data in step 412 that the update signal has been sent. If interdepending data of the update signal send in step 426 is appropriate for another target exchange, then another loop is performed and the method proceeds with the same interdepending data from step 412 to step 414, and so on. If the interdepending data does not apply to any other exchange, then the method proceeds from step 428 to step 412 and the update manager is instructed to retrieve the next data in queue, or await further interdepending data if there is none to be processed. If operation of the update manager is suspended for any reason, the method proceeds in accordance with the "END" branch from step 412 to step 430, where the method ends.

Figure 5:
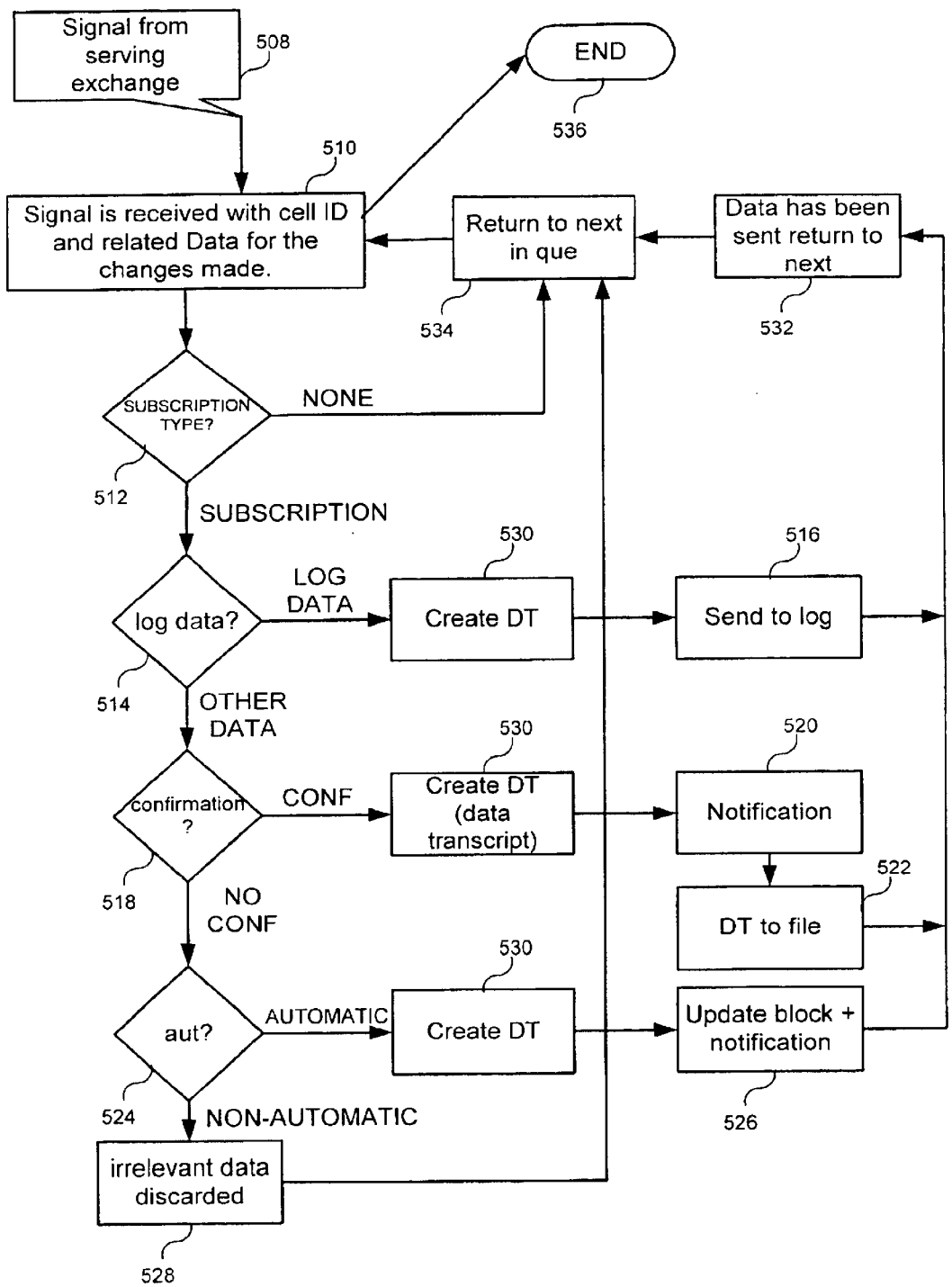
FIG. 5 depicts an exemplary flow diagram of functions performed in a target exchange upon receiving an update signal from a serving exchange.

FIG. 5 depicts an exemplary flow diagram of functions performed in a target exchange upon receiving an update signal from a serving exchange, according to the present invention. The function performed in FIG. 5 of determining what to do with received data may be referred to as a filter function. The filter functions may be implemented as a procedure, algorithm, logical steps or set of instructions, which are performed in the target exchange. Alternatively, some steps depicted in the figure, or functions of the steps, may be performed in the serving exchange. A target exchange which receives an update signal sent from a serving exchange, may either use all of the interdepending data contained in an update signal or may only use a portion of the data, depending upon the capabilities of the target exchange which receives an update signal.

The method begins in step 508 with an update signal being sent from the serving exchange to the target exchange, and the method proceeds to step 510. In step 510 the update signal is received. In some embodiments, the types and amount of information included in an update signal depend upon whether the target exchange has a subscription. In other embodiments, the update signals are prepared as if the target exchange has a subscription. In these embodiments the update signals sent to a target exchange include all available information, regardless of whether or not the exchange has a subscription which will allow use of the update information. The exemplary embodiment depicted in FIG. 5 receives an update signal with more information in it than just the information specific to the target exchange's subscription. The update signal typically has the cell ID and related data for the changes made to the cell, or other like types of information. Once the update signal is received in step 510, the method proceeds to step 512.

In step 512 the type of subscription a target exchange has is determined. If the target exchange does not have a subscription service, the method proceeds in accordance with the "NONE" branch to step 534, to wait for another update signal from a serving exchange for which the target exchange has a subscription. Otherwise, for a target exchange which does have a subscription as determined in step 512, the method proceeds in accordance with the "SUBSCRIPTION" branch to step 514. In accordance with the exemplary embodiment depicted in the figure, the subscription type may provide for log data information, confirmation data, or automatic entry data. Alternative embodiments of the invention can provide for other like treatments of the interdepending data contained in an update signal.

In step 514 it is determined whether the information sent in the update signal is intended only for the log file. The log file contains a record of all transactions, or proposed changes to interdepending data, that have been received. Items entered into the log file can be reviewed, and manually programed into the target exchange by a human operator. In exemplary embodiments of the present invention, the target exchange's subscription may be predefined such that some items of interdepending data are sent to the log file to be entered manually, rather than being entered automatically by the processing means of the target exchange. If it is determined in step 514 that the update signal contains data which is to be entered into the log file, the method proceeds in accordance with the "LOG DATA" path to step 530 where a data transcript containing the log data is created from the interdepending data in the update signal. Creating the data transcript puts the interdepending data from the update signal into the proper format for programing the target exchange.

Once the data transcript has been created in step 530, the method then proceeds to step 516 for sending the log data to the appropriate log file storage areas, and then to steps 532 and 534 to loop back and process the next update signal, or the next portion of data from the present update signal if data remains to be processed. In step 534, if there is no more interdepending data in the update signal to be processed, the method proceeds to the next update signal if there is one, or else waits for another update signal to be sent. If, in step 534, there is more data within the present update signal which has not yet been processed, the method loops back around to attend to the additional interdepending data. Back in step 514, if it is determined that data other than log information is contained in the update signal, the method proceeds in accordance with the "OTHER DATA" path to step 518.

In step 518 it is determined whether a data confirmation is required to implement the changes specified by the update message. If, as determined in step 518, confirmation is needed, then the method proceeds in accordance with the "CONFIRM" path from step 518 to step 530 for creation of a data transcript. Once the data transcript has been created, the method proceeds from step 530 to step 520. In step 520 a notification is sent to alert the operator that an update is received. Once the notification is made, the method proceeds from step 520 to step 522 where the data transcript is provided to the appropriate file within the target exchange. Saving the data transcript to a file changes the data of interest within the update signal, e.g., a cell parameter. The method then proceeds to steps 532 and 534 to loop back and process the next update signal. If step 518 determines that no confirmation is needed, the method proceeds in accordance with the "NO CONFIRM" branch to step 524.

In step 524 it is determined whether the data changes specified in the update signal will be performed automatically. If data changes are to be automatic the method proceeds in accordance with the "AUTOMATIC" path from step 524 to step 530 where a data transcript is created. The method then proceeds to step 526 to make the data changes in the target exchange and perform an update block notification. The method then to steps 532 and 534 to loop back and process the next update signal. If, in step 524 it is determined that the data changes specified in the update signal will not be performed automatically, the method proceeds in accordance with the "NON-AUTOMATIC" path from step 524 to step 528.

If the method has continued to step 528, it is presumed that the cell specified in the update signal does not exist, or that no action be taken. In some exemplary embodiments an error message can be sent back to the serving exchange as part of step 528. Upon performing step 528, the method proceeds from step 528 to step 534 to loop back and process the next update signal. From step 534 the method proceeds to step 510 where update signals are received. If no update signals have been received in step 510, the method can enter a monitor mode to wait for update signals. In alternative embodiments, the method proceeds to step 536 and ends, until another update signal is sent.

In the foregoing disclosure, the invention is described in terms of exchanges in a wireless communication system, for ease of illustration. The exchange may be an MSC in a cellular telephony system. However, other embodiments of the present invention may more generally apply to an exchange being defined as a grouping of wireless users in a geographic division of a communication network, or a node of a satellite based communication system, or other like division of a mobile communication system.

For purposes of explanation and not limitation, some specific details are set forth herein, such as particular circuits, system component relationships, techniques, etc. in order to provide a thorough understanding of the present invention. However, it will be apparent to those skilled in the art that the present invention may be practiced in other embodiments that depart from these specific details. In other instances, detailed descriptions of well-known methods, devices, and circuits are omitted so as not to obscure the description of the present invention.

The exemplary wireless communication systems discussed herein are described as using either time division multiple access (TDMA) protocol, in which communication between the base station and the mobile terminals is performed over a number of time slots, or code division multiple access (CDMA), wherein channelization is performed using different spreading codes. However, those skilled in the art will appreciate that the concepts disclosed herein find use in other protocols, including, but not limited to, frequency division multiple access (FDMA), or some hybrid of any of the above protocols. Likewise, some of the exemplary embodiments provide illustrative examples relating to the GSM or ANSI-136 systems, however, the techniques described herein are equally applicable to any type of system.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A method of providing interdepending data from a first exchange to a plurality of exchanges in a wireless communication system, the method comprising steps of:

manually entering cell data for a cell of the first exchange;

triggering by the first exchange an update event in response to the step of manually entering;

defining a data update message comprising interdepending data of the cell data within the first exchange in response to said step of triggering; and directly conveying the data update message via a communication link from the first exchange to a second exchange in response to the triggering step;

wherein the second exchange has a subscription to the first exchange.

2. The method of claim 1, wherein the data update message is automatically entered into the second exchange in response to the step of conveying.

3. The method of claim 2, wherein the interdepending data in the data update message is based upon the subscription between the first exchange and the second exchange.

4. The method of claim 3, wherein the defining step comprises:

identifying a first cell in the first exchange and a second cell in the second exchange.

5. The method of claim 4, wherein the defining step comprises:

building an IS-41 signal.

6. The method of claim 4, wherein the first cell is adjacent to the second cell.

7. The method of claim 3, wherein the manually entering step comprises:

inputting a man-machine-language command by a human operator.

8. The method of claim 3, wherein the human operator inputs using an I/O device of the first exchange during the manually entering step.

9. The method of claim 3, further comprising:

performing an inter-exchange traffic handling event using said interdepending data.

10. A system for providing interdepending data from a serving exchange to a target exchange in a wireless communication system, the system comprising:

a data input device of the serving exchange for manually entering cell data into the serving exchange;

a memory of the serving exchange for storing the interdepending data entered into the serving exchange;

an update manager within the serving exchange for defining a data update message comprising interdepending data of the cell data; and a communication link for directly conveying the data update message from the serving exchange to the target exchange.

11. The system of claim 10, wherein the date input device accepts manual entry of man-machine-language commands by a human operator.

12. The system of claim 10, wherein the data update message are conveyed using an IS-41 signal protocol.

* * * * *